(12) United States Patent
Komine

(10) Patent No.: US 7,869,081 B2
(45) Date of Patent: Jan. 11, 2011

(54) IMAGE-FORMING APPARATUS FOR PRINTING DATA OF A SPECIFIED RANGE, IMAGE-FORMING METHOD THEREOF AND COMPUTER PRODUCT INCLUDING THEREOF

(75) Inventor: Noriharu Komine, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1127 days.

(21) Appl. No.: 11/519,060

(22) Filed: Sep. 12, 2006

(65) Prior Publication Data

US 2007/0070406 A1 Mar. 29, 2007

(30) Foreign Application Priority Data

Sep. 15, 2005 (JP) .............................. 2005-269264

(51) Int. Cl.
*G06K 15/00* (2006.01)
*G06F 3/12* (2006.01)
(52) U.S. Cl. .................................... 358/1.18; 358/1.15
(58) Field of Classification Search ................ 358/1.18, 358/1.15
See application file for complete search history.

(56) References Cited

U.S. PATENT DOCUMENTS 6,313,919 B1 * 11/2001 Nakagiri et al. ............ 358/1.11

2003/0053133 A1 * 3/2003 Nakagiri et al. ............ 358/1.18

FOREIGN PATENT DOCUMENTS

| JP | 05-238113 | 9/1993 |
|---|---|---|
| JP | 06-187334 | 7/1994 |
| JP | 08-324031 | 12/1996 |
| JP | 09-222965 | 8/1997 |
| JP | 2001-056752 | 2/2001 |

OTHER PUBLICATIONS

Japanese Office Action dated Jun. 29, 2010, issued in corresponding Application No. JP 2005-269264.

* cited by examiner

*Primary Examiner*—Twyler L Haskins
*Assistant Examiner*—Fred Guillermety
(74) *Attorney, Agent, or Firm*—Harness, Dickey & Pierce, P.L.C.

(57) ABSTRACT

A receiving section receives from a host computer print job data containing print data and print information. An analyzing section analyzes the print job data to determine whether the print information includes START and END commands that specify a range of the print data to be output. A setting section sets the range specified by the START and END commands as a print range. An outputting section prints data in the print range.

9 Claims, 11 Drawing Sheets

PRINT DATA

START=4, END=6

THIRD EMBODIMENT

FOURTH EMBODIMENT

FIG.5
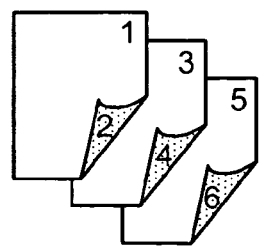
PRINT DATA
START=4, END=5
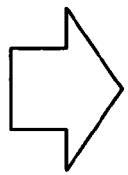
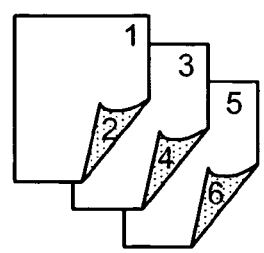
NOT COMPATIBLE TO
START/END COMMANDS
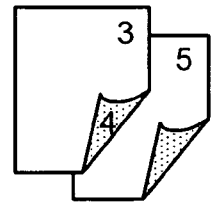
FIRST EMBODIMENT

FIG.7
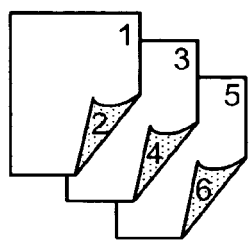
PRINT DATA
START=4, END=5
TWO SETS
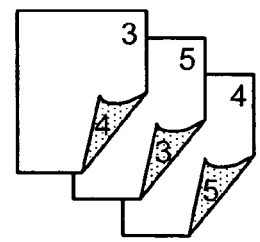
FIRST EMBODIMENT
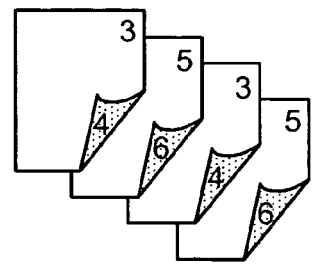
SECOND EMBODIMENT

FIG.9
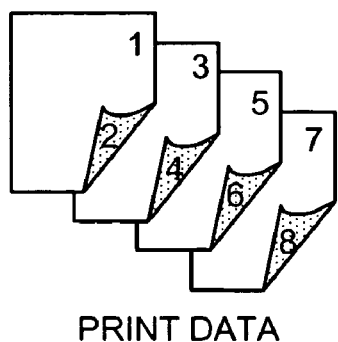
PRINT DATA
START=4, END=5
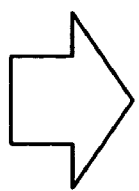
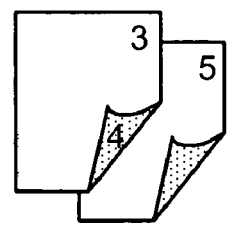
FIRST EMBODIMENT
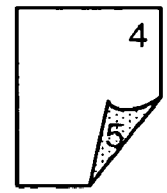
THIRD EMBODIMENT

FIG.11
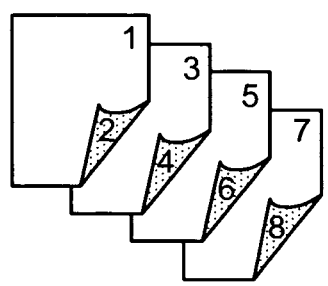
PRINT DATA
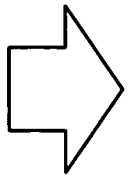
START=4, END=6
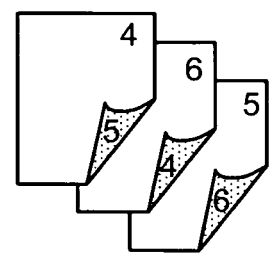
THIRD EMBODIMENT
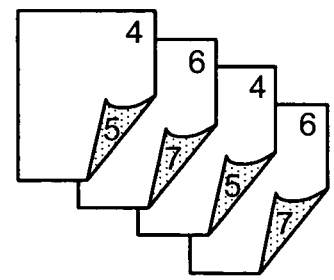
FOURTH EMBODIMENT

IMAGE-FORMING APPARATUS FOR PRINTING DATA OF A SPECIFIED RANGE, IMAGE-FORMING METHOD THEREOF AND COMPUTER PRODUCT INCLUDING THEREOF

CROSS-REFERENCE TO RELATED APPLICATIONS

The present document incorporates by reference the entire contents of Japanese priority document, 2005-269264 filed in Japan on Sep. 15, 2005.

BACKGROUND OF THE INVENTION

1. Field of the Invention

The present invention relates to a technology for outputting input data in a specific range.

2. Description of the Related Art

A printer control unit (an image-forming apparatus) has been used which is capable of printing a specific part of image data. For example, Japanese Patent Application Laid-Open No. H5-238113 discloses a technique in which a page where printing is to be started (hereinafter, "printing start page") and a page where printing is to be stopped (hereinafter, "printing end page") are specified through an operation panel, etc. so that image data on only desired pages are to be printed. Another technique has been proposed in which a START command specifying a printing start page and an END command specifying a printing end page are sent from an information processor or the like to an image-forming apparatus so that image data only in a specific range are to be printed.

In the conventional technique disclosed in Japanese Patent Application Laid-Open No. H5-238113, however, the user is required to set a range of data or pages to be printed (hereinafter, "print range") through the operation panel on a printer as well as sending a printing request with print job data from an information processor such as a personal computer (PC) to the printer. As a result, the user is compelled to perform complicated operations for printing the intended print range.

In the conventional technique in which START and END commands are sent together with print job data to a printer, if a manufacturer of the printer is different from that of a printer driver, the START and END commands may be rejected by the printer. In such a case, the printer outputs all data contained in the print job data, from the first page to the last page, instead of printing data in a specified range. Therefore, to print data in the specified range only, it is required to send the printer only the data at a print language level or an application level in a PC, which increases loads on the PC.

SUMMARY OF THE INVENTION

It is an object of the present invention to at least partially solve the problems in the conventional technology.

According to an aspect of the present invention, an image-forming apparatus includes a receiving unit that receives, from an information processor connected to the image-forming apparatus via a network, output job data including output data and output information of the output data, an analyzing unit that analyzes the output job data to determine whether the output information includes a START command specifying a first point of the output data where output is to be started and an END command specifying a second point of the output data where output is to be stopped, a setting unit that sets, when the output information includes the START command and the END command, the first point as an output start page and the second point as an output end page, and an outputting unit that outputs a portion of the output data from the output start page to the output end page.

According to another aspect of the present invention, an image-forming method includes receiving output job data that includes output data and output information of the output data, analyzing the output job data to determine whether the output information includes a command specifying a range of the output data, setting, when the output information includes the command, the range specified by the command as a print range, and outputting data in the print range.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic for explaining the operation of the printer shown in FIG. 4;

FIG. 7 is a schematic for explaining the operation of the printer shown in FIG. 6;

FIG. 9 is a schematic for explaining the operation of the printer shown in FIG. 8;

FIG. 11 is a schematic for explaining the operation of the printer shown in FIG. 10.

DETAILED DESCRIPTION OF THE PREFERRED EMBODIMENTS

Exemplary embodiments of the present invention are described in details below with reference to the accompanying drawings. Although the embodiments of the present invention is explained using a printer as an example, the present invention is not limited thereto but rather is applicable to any image-forming apparatus such as a multifunction product, a copier, and a facsimile machine.

In a conventional technology, when START and END commands are sent to a printer together with print job data to specify a print range, the printer may not accurately output data in the print range if a manufacturer of the printer is different from that of a printer driver. In addition, when the START command specifies an even-numbered page as a printing start page, the even-numbered page is printed on the back side of printing paper with the front left blank, and printed data differs from the original one. In the first embodiment of the present invention, when the START command specifies an even-numbered page as a printing start page, printing is started from a page immediately before the even-numbered page not to leave the front side of printing paper blank. Thus, printed data can be obtained which is identical with the original one.

Figure 1:
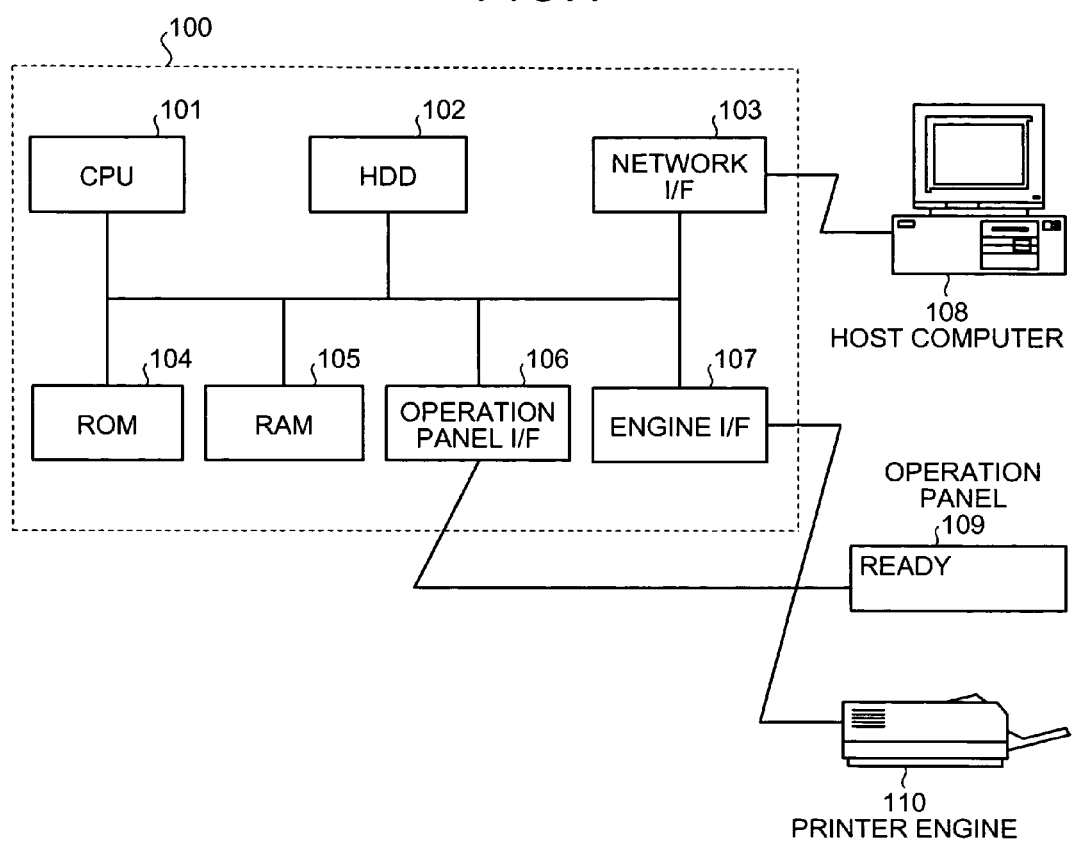
FIG. 1 is a schematic for explaining a hardware configuration of a printer according to a first embodiment of the present invention.

FIG. 1 is a schematic of a hardware configuration of a printer 100 according to the first embodiment of the present invention. The printer 100 is connected to a host computer 108 via a network, and prints an image based on image data received from the host computer 108 on printing paper or the like.

The printer 100 is also connected to an operation panel 109 and a printer engine 110. The operation panel 109 displays an entry screen for a user to input data through operation keys. The printer engine 110 forms the image on the printing paper.

The printer 100 includes, on its controller board, a Central Processing Unit (CPU) 101, a Hard Disk Drive (HDD) 102, a network interface (I/F) 103, a Read Only Memory (ROM) 104, a Random Access Memory (RAM) 105, an operation panel I/F 106, and an engine I/F 107, which are connected to each other by a bus.

The network I/F 103 controls input to and output from the host computer 108. The operation panel I/F 106 controls input to and output from the operation panel 109. The engine I/F 107 controls the printer engine 110. The ROM 104 stores therein an image-forming program.

Figure 2:
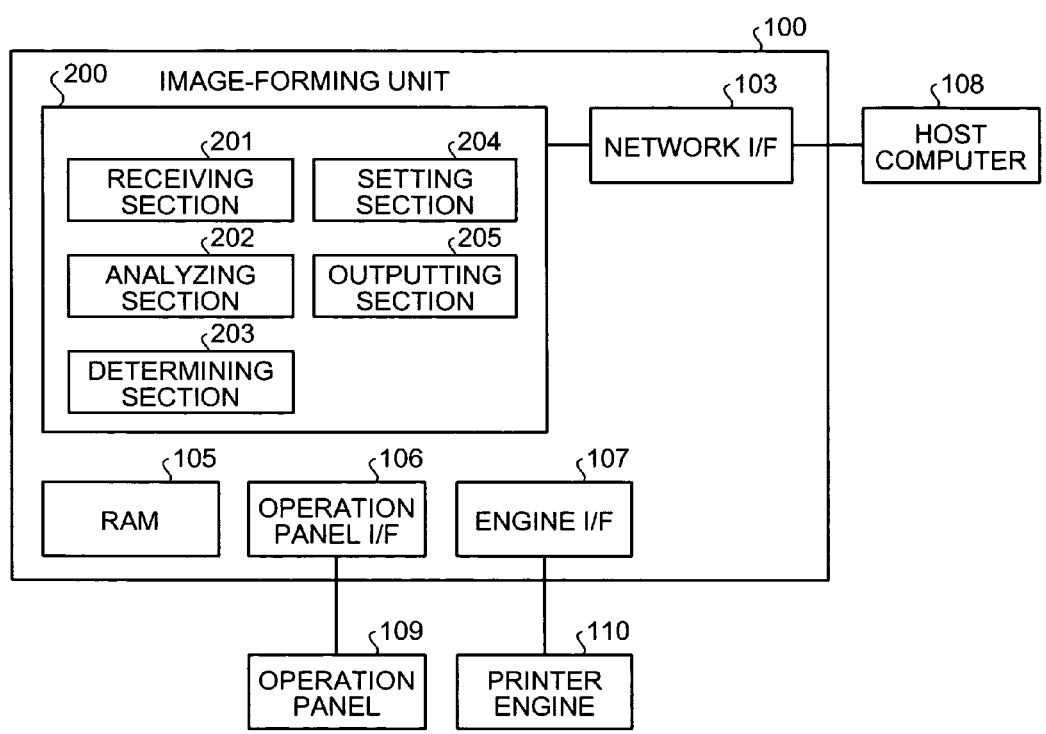
FIG. 2 is a functional block diagram of an image-forming unit in the printer shown in FIG. 1.

FIG. 2 is a functional block diagram of an image-forming unit 200 of the printer 100. The image-forming unit 200 forms image data based on print job data received from the host computer 108, and sends the image data to the printer engine 110.

Upon printing, the host computer 108 accepts print settings specified by the user, and sends print job data to the printer 100. The print settings include a START command for specifying a printing start page and an END command for specifying a printing end page.

Figure 3:
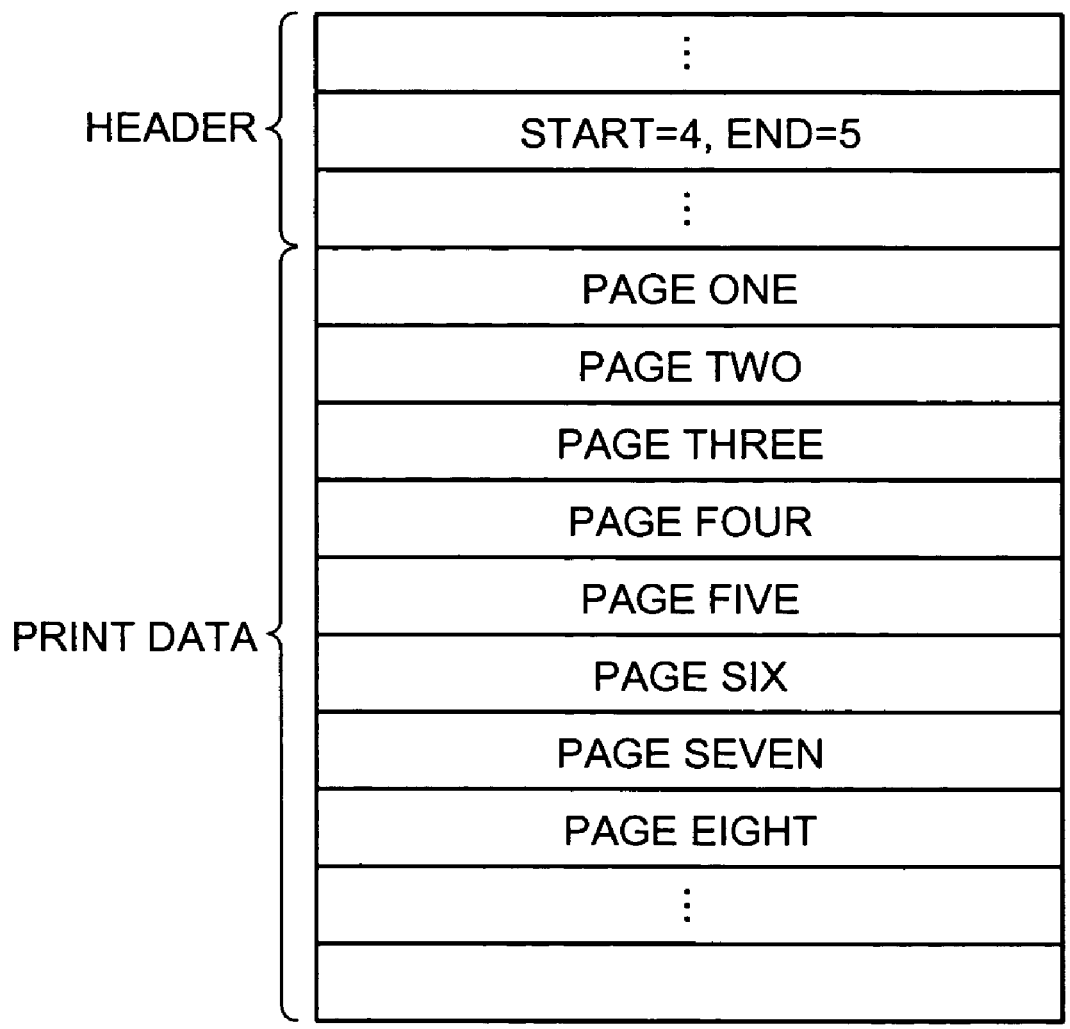
FIG. 3 is an example of contents of print job data.

The print job data contains print data and print information. The print data is data on one or more pages to be printed, and the print information is data concerning the print data including the print settings specified by the user, both sent by the host computer 108 to the printer 100 for printing. FIG. 3 is an example of contents of the print job data. The print job data consists of a header with the print information and the print data. The header contains, for example, the START command and the END command.

The RAM 105 temporarily stores as image data a bit-map of the print data in the print job data received from the host computer 108.

The image-forming unit 200 includes a receiving section 201, an analyzing section 202, a determining section 203, a setting section 204, and an outputting section 205.

The receiving section 201 receives print job data from the host computer 108 via the network I/F 103. The analyzing section 202 analyzes the print job data received by the receiving section 201 to determine whether the header contains print information including a START command and an END command.

When the analyzing section 202 determines that the print information includes the START command and the END command, the setting section 204 specifies, based on the START command and the END command, a parameter for a printing start page and a parameter for a printing end page among the pages of the print data. In duplex mode, if the determining section 203 determines that the printing start page specified by the START command is even-numbered when counted from the first page of the print data, for example, the fourth page or the sixth page, the setting section 204 changes the parameter for the printing start page to indicate a page immediately before the even-numbered page. Specifically, when the START command specifies the fourth page, the setting section 204 specifies the third page as the printing start page. Similarly, when the START command specifies the sixth page, the setting section specifies the fifth page as the printing start page.

The outputting section 205 converts the print data of pages from the printing start page to the printing end page, both specified by the parameters, into a bit-map to form image data. The image data is sent to the printer engine 110 via the engine I/F 107, and printed according to an instruction by the setting section 204.

The determining section 203 determines, in duplex mode, whether a page indicated by a parameter for the printing start page set by the setting section 204 is even-numbered or odd-numbered when counted from the first page of the print data.

Figure 4:
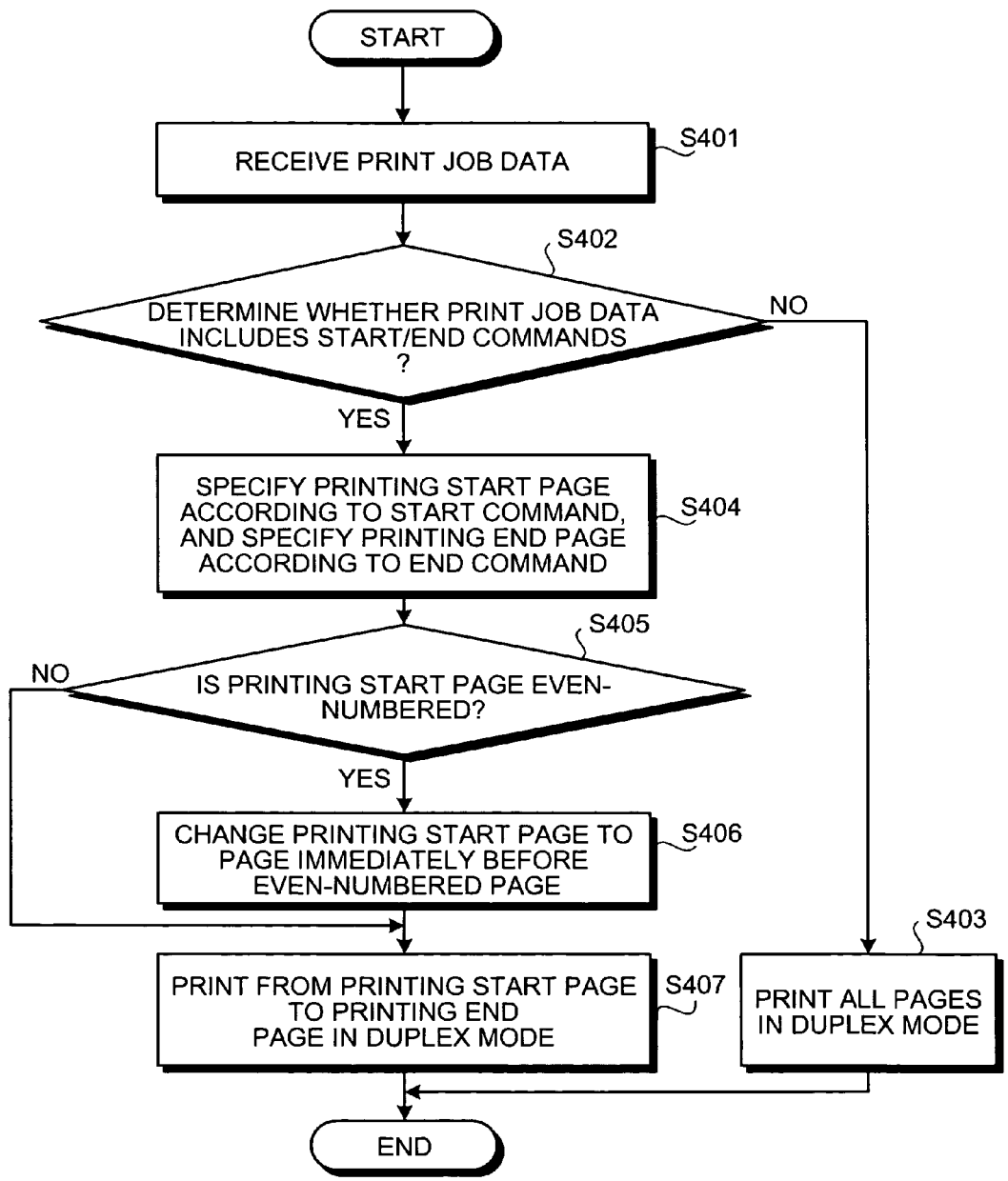
FIG. 4 is a flowchart of the operation of the printer for specifying pages to be printed.

FIG. 4 is a flowchart of the operation of the printer 100 for specifying pages to be printed according to the first embodiment.

Having received a request for duplex printing through an application, etc., the host computer 108 generates print job data with a printer driver. The print job data is sent to the printer 100. When the user has specified a printing start page or a printing end page, the print job data contains in the header a START command or an END command.

The receiving section 201 receives the print job data from the host computer 108 via the network I/F 103 (step S401). The analyzing section 202 analyzes the print job data received by the receiving section 201 to determine whether the print job data contains in the header print information that includes a START command or an END command indicating a print range specified by a user (step S402). When the analyzing section 202 determines that the print information does not include a START command nor an END command (No at step S402), the outputting section 205 sends image data formed based on all pages of the print data to the printer engine 110 for duplex printing of the image data (step S403).

When the analyzing section 202 determines that the print information includes a START command and an END command (Yes at step S402), the setting section 204 specifies a parameter for the printing start page according to the START command and a parameter for the printing end page according to the END command (step S404).

Next, the determining section 203 determines whether a page indicated by the parameter for the printing start page is even-numbered when counted from the first page of the print data (step S405). When the determining section 203 determines that the printing start page is even-numbered (Yes at step 405), the setting section 204 changes the parameter for the printing start page to indicate a page immediately before the even-numbered page set at step 404 (step S406). By specifying an odd-numbered page (printed on the front side of printing paper) as the printing start page, the front side is not to be left blank.

When the determining section 203 determines that the printing start page is odd-numbered (No at step 405), the parameter for the printing start page is not changed. In this case, printing starts with an odd-numbered page (printed on the front side of printing paper), and there is no change from the original print data.

Then, the outputting section 205 sends the printer engine 110 image data formed based on a portion of the print data for pages from the printing start page to the printing end page, both specified by the parameters set by the setting section 204. The image data are printed in duplex mode (step S407).

The process shown in FIG. 4 is more fully explained with a specific example. FIG. 5 is a schematic for explaining the operation of the printer 100 for specifying pages to be printed.

In FIG. 5, the print job data includes print data for six pages in which the fourth page is specified by a START command and the fifth page is specified by an END command. With a conventional printer not compatible to such START and END commands, even when a print range is specified by the START and END commands, the conventional printer cannot recognize the print range (an upper right view in FIG. 5). Consequently, all the print data, i.e., the print data for the first to sixth pages, are printed.

On the other hand, the printer 100 according to the first embodiment analyzes the print job data to determine whether the header contains the START and END commands, and recognizes the print range specified by the START and END commands even when a manufacturer of the printer 100 is different from that of the printer driver. Therefore, in the example of FIG. 5, the setting section 204 specifies the fourth page as a parameter for the printing start page and the fifth page as a parameter for the printing end page in the print data (step S404 in FIG. 4).

Next, the determining section 203 determines whether the page indicated by the parameter for the printing start page is even-numbered when counted from the first page of the print data (step S405 in FIG. 4). In this case, the fourth page is specified as the printing start page, and the printing start page is determined as an even-numbered page. Accordingly, the setting section 204 changes the parameter for the printing start page to indicate a page immediately before the fourth page, i.e., the third page (step S406 in FIG. 4). As a result, the printer 100 prints the third to fifth pages (a lower right view in FIG. 5).

As described above, according to the first embodiment, the analyzing section 202 determines whether print information includes START and END commands. When the print information includes the START and END commands, the setting section 204 sets the page specified by the START command as the printing start page and the page specified by the END command as the printing end page. The outputting section 205 outputs data for pages from the printing start page to the printing end page so that the pages are printed. In duplex mode, the determining section 203 determines whether the page specified as the printing start page is even-numbered when counted from the first page of print data. When the printing start page is even-numbered, the setting section 204 changes the printing start page to a page immediately before the even-numbered page.

Thus, the printer 100 performs printing while analyzing print job data received from the host computer 108, which reduces the work load on the host computer 108 as well as eliminating the need to specify a print range on the printer 100 side. In addition, even when a manufacturer of the driver of the printer 100 is different from that of the printer 100, the printer 100 can reliably print data in a print range specified by the user. Further, print data can be printed by a simple operation without any change from the original print data. Therefore, the user can easily compare a page of partially printed data with a corresponding page of the original data (entirely printed).

In the first embodiment, when a printing start page specified by a START command is even-numbered, the printer 100 changes the printing start page to a page immediately before the even-numbered page for printing. If the user prints two or more sets of data and a printing end page of the first set is odd-numbered, the printing start page of the second set is printed on the back side of the printing end page. In a second embodiment, when a printing end page specified by an END command is odd-numbered, a printer changes the printing end page to a page immediately after the odd-numbered page for printing.

The printer of the second embodiment is similar in configuration to the printer 100 except for the determining section 203 and the setting section 204, and the same description is not repeated. The determining section 203 and the setting section 204 have additional functions to those previously described in the first embodiment (refer to FIG. 2).

The determining section 203 also determines whether a parameter for a printing end page set by the setting section 204 indicates an even-numbered or odd-numbered page counted from the first page of print data.

When the determining section 203 determines that the printing end page is odd-numbered, for example the third or fifth page, the setting section 204 changes the parameter for the printing end page to indicate a page immediately after the odd-numbered page. For example, when an END command specifies the third page, the setting section 204 specifies the fourth page, and when an END command specifies the fifth page, the setting section 204 specifies the sixth page.

Figure 6:
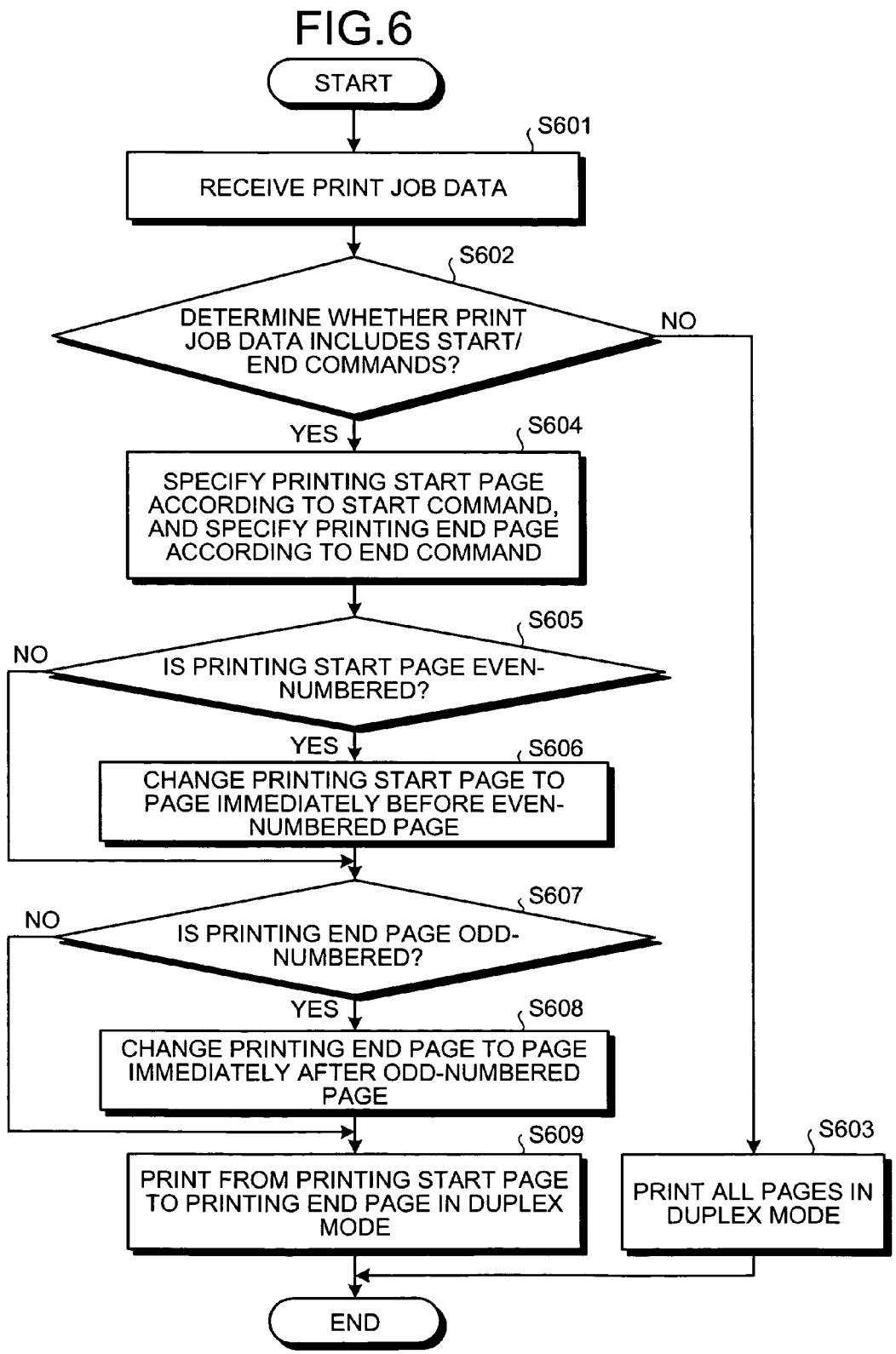
FIG. 6 is a flowchart of the operation of a printer for specifying pages to be printed according to a second embodiment of the present invention.

FIG. 6 is a flowchart of the operation of the printer for specifying pages to be printed according to the second embodiment.

In FIG. 6, steps S601 to S606, i.e., from receipt of print job data by the receiving section 201 until the setting section 204 changes the printing start page to a page immediately before the even-numbered page, are the same as steps S401 to S406 in FIG. 4, and the description thereof is not repeated.

After the setting section 204 changes the printing start page to a page immediately before the even-numbered page at step S606, the determining section 203 determines whether the parameter for the printing end page set by the setting section 204 indicates an even-numbered or odd-numbered page counted from the first page of the print data (step S607). When the determining section 203 determines that the parameter for the printing end page indicates an odd-numbered page (Yes at step S607), the setting section 204 changes the parameter for the printing end page to a page immediately after the odd-numbered page set at the step 604 (step S608). By setting an even-numbered page (printed on the back side of printing paper) as the printing end page, when the user prints two or more sets of data, the printing start page of the second set is not to be printed on the back side of the printing end page of the first set.

When the determining section 203 determines that the parameter for the printing end page indicates an even-numbered page (No at step S607), the parameter is not changed. In this case, the printing end page is printed on the back side of printing paper, and, even when the user prints two or more sets of data, the printing start page of the second set is not to be printed on the back side of the printing end page of the first set.

Then, the outputting section 205 sends the printer engine 110 image data formed based on a portion of the print data for pages from the printing start page to the printing end page, both specified by the parameters set by the setting section 204. The image data are printed in duplex mode (step S609).

Next, the process shown in FIG. 6 is described in details with a specific example. FIG. 7 is a schematic for explaining the operation of the printer according to the second embodiment.

In FIG. 7, print job data includes print data for six pages in which the fourth page is specified by a START command and the fifth page is specified by an END command. Two sets of the print data are printed. In the first embodiment described previously in connection with FIG. 5, the third to fifth pages are printed. Therefore, in this case, the printing start page of the second set is printed on the back side of the printing end page of the first set. Specifically, the third page of the second set is printed on the back side of the fifth page of the first set (an upper right view in FIG. 7).

In the printer according to the second embodiment, when the fourth page is specified by the START command and the fifth page is specified by the END command, the setting section 204 specifies the fourth and fifth pages, counted from the first page of the print data, as parameters for the printing start page and the printing end page, respectively (step S604 in FIG. 6). As in the first embodiment, the setting section 204 changes the parameter for the printing start page to the page immediately before the fourth page, i.e., the third page (step S606 in FIG. 6).

The determining section 203 determines whether the parameter for the printing end page indicates an even-numbered or odd-numbered page counted from the first page of the print data (step S607 in FIG. 6). In the example of FIG. 7, the fifth page is specified as the printing end page, and the printing end page is determined as an odd-numbered page. The setting section 204 changes the parameter for the printing end page to indicate a page immediately after the fifth page, i.e., the sixth page (step S608 in FIG. 6). As a result, the printer according to the second embodiment prints the third to sixth pages so that the printing start page of the second set is printed on the front side of printing paper (a lower right view in FIG. 7).

As described above, according to the second embodiment, the determining section 203 determines whether the printing end page is even-numbered or odd-numbered when counted from the first page of the print data. When the determining section 203 determines that the printing end page is odd-numbered, the setting section 204 changes the printing end page to a page immediately after the odd-numbered page. Thus, even when the user prints two or more sets of data, the printing start page of the second set is not to be printed on the back side of the printing end page of the first set. Further, two or more sets of print data can be printed by a simple operation without any change from the original print data.

In a conventional technology, when a printing start page specified by a START command is even-numbered, the even-numbered page is printed on the back side of printing paper even if the printing start page is a first page of a chapter. In a printer according to a third embodiment, a printing start page can be printed on the front side of printing paper even when the printing start page is even-numbered.

The printer of the third embodiment is similar in configuration to the printer 100 except for the setting section 204, and the same description is not repeated. The setting section 204 has a function different from that previously described in the first embodiment (refer to FIG. 2).

When the analyzing section 202 determines that print job data contains in the header print information including START and END commands, the setting section 204 specifies a parameter for the printing start page according to the START command and a parameter for the printing end page according to the END command. When the determining section 203 determines that the printing start page is even-numbered, for example, the fourth page counted from the first page of the print data, the setting section 204 specifies a parameter so that the printing start page is printed on the front side of printing paper.

Figure 8:
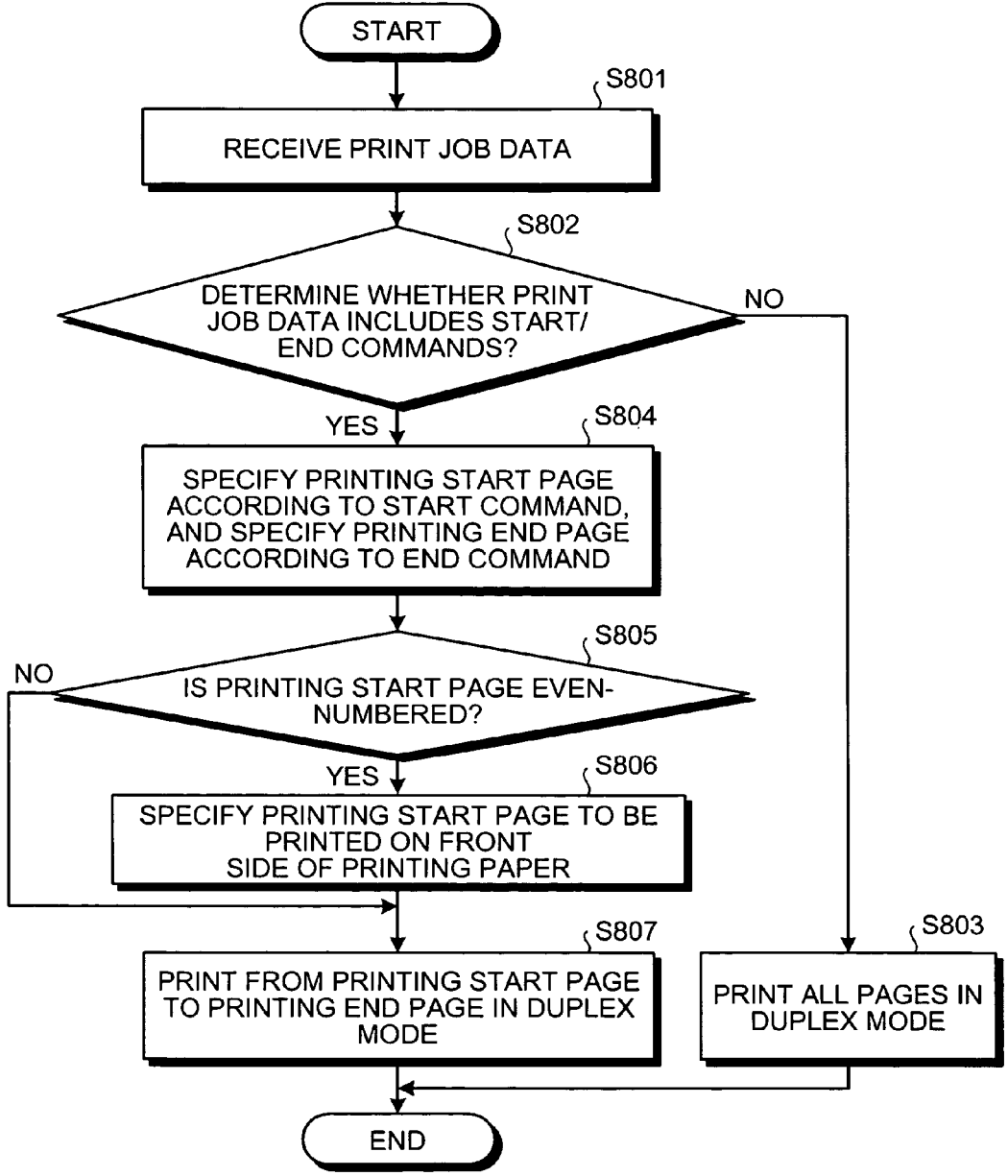
FIG. 8 is a flowchart of the operation of a printer for specifying pages to be printed according to a third embodiment of the present invention.

FIG. 8 is a flowchart of the operation of the printer for specifying pages to be printed according to the third embodiment.

In FIG. 8, steps S801 to S804, i.e., from receipt of print job data by the receiving section 201 until the setting section 204 specifies a printing start page and a printing end page, are the same as steps S401 to S404 in FIG. 4, and the description thereof is not repeated.

After the printing start page and the printing end page are specified according to the START and END commands at step S804, the determining section 203 determines whether a parameter for the printing start page indicates an even-numbered page or an odd-numbered page counted from the first page of the print data (step S805). When the determining section 203 determines that the parameter for the printing start page indicates an even-numbered page (Yes at step S805), the setting section 204 resets the parameter so that the printing start page is printed on the front side of printing paper (step S806). Accordingly, if the printing start page specified by the START command is the first page of a chapter and is even-numbered, the specified page can be printed as the head page on the front side of printing paper.

When the determining section 203 determines that a page indicated by the parameter for the printing start page is odd-numbered (No at step S805), the parameter is not changed. In this case, printing starts from the odd-numbered page on the front side of printing paper, and, even when the printing start page is the first page of a chapter, the page is printed as the head page on the front side of printing paper.

Then, the outputting section 205 sends the printer engine 110 image data formed based on a portion of the print data for pages from the printing start page to the printing end page, both specified by the parameters set by the setting section 204. The image data are printed in duplex mode from the front side of printing paper according to the parameter set at the step S806 (step S807).

Next, the process shown in FIG. 8 is described in details with a specific example. FIG. 9 is a schematic for explaining the operation of the printer according to the third embodiment.

In FIG. 9, print job data includes print data for eight pages in which the fourth page is specified by a START command and the fifth page is specified by an END command. In the first embodiment described previously in connection with FIG. 5, the third to fifth pages are printed. Therefore, in this case, the fourth page which is specified as the printing start page by the START command is printed on the back side of printing paper (an upper right view in FIG. 9).

In the printer according to the third embodiment, when the fourth page is specified by the START command and the fifth page is specified by the END command, the setting section 204 specifies the fourth and fifth pages, counted from the first page of the print data, as parameters for the printing start page and the printing end page, respectively (step S804 in FIG. 8).

The determining section 203 determines whether a page indicated by the parameter for the printing start page is even-numbered or odd-numbered when counted from the first page of the print data (step S805 in FIG. 8). In the example of FIG. 9, the fourth page is specified as the printing start page, and the printing start page is determined as an even-numbered page. Then, the setting section 204 resets the parameter for the printing start page so that the fourth page is printed on the front side of printing paper (step S806 in FIG. 8). As a result, the printer according the third embodiment prints the fourth to fifth pages with the fourth page printed on the front side of printing paper (a lower right view in FIG. 9).

As described above, according to the third embodiment, the determining section 203 determines whether the printing start page is even-numbered or odd-numbered when counted from the first page of the print data. When the determining section 203 determines that the printing start page is even-numbered, the setting section 204 sets a parameter so that the printing start page is printed on the front side of printing paper. Thus, when the first page of a chapter is specified as the printing start page, the page can be printed as the head page on the front side of printing paper by a simple operation.

In the third embodiment, when a printing start page is even-numbered, the printer specifies a parameter so that the printing start page is printed on the front side of printing paper for printing. If the user prints two or more sets of data and a printing end page of the first set is printed on the front side of printing paper, the printing start page of the second set is printed on the back side of the printing end page. In a fourth embodiment, when a printing end page specified by an END command is to be printed on the front side of printing paper, a printer changes the printing end page to a page immediately after the page specified by the END command for printing.

The printer of the fourth embodiment is similar in configuration to the printer 100 except for the determining section 203 and the setting section 204, and the same description is not repeated. The determining section 203 and the setting section 204 have functions different from those previously described in the first embodiment (refer to FIG. 2).

When the analyzing section 202 determines that print job data contains in the header print information including START and END commands, the setting section 204 specifies a parameter for the printing start page according to the START command and a parameter for the printing end page according to the END command. When the determining section 203 determines that the printing start page is even-numbered, for example, the fourth page counted from the first page of the print data, the setting section 204 resets the parameter for the printing start page so that the printing start page is printed on the front side of printing paper When the determining section 203 determines that the printing start page is even-numbered and that the printing end page is even-numbered, the setting section 204 changes the parameter for the printing end page to indicate a page immediately after the even-numbered page. For example, when the fourth page is specified as the printing start page and the sixth page is specified as the printing end page, the fourth to seventh pages are specified to be printed. Further, when the determining section 203 determines that the printing start page is odd-numbered and that the printing end page is odd-numbered, the setting section 204 changes the parameter for the printing end page to indicate a page immediately after the odd-numbered page. For example, when the third page is specified as the printing start page and the fifth page is specified as the printing end page, the third to fourth pages are specified to be printed.

The determining section 203 determines whether a page indicated by a parameter for the printing start page specified by the setting section 204 is even-numbered or odd-number when counted from the first page of the print data. After determining that the printing start page is even-numbered or odd-number, the determining section 203 determines whether the printing end page specified by the setting section 204 is even-numbered or odd-numbered when counted from the first page of the print data.

Figure 10:
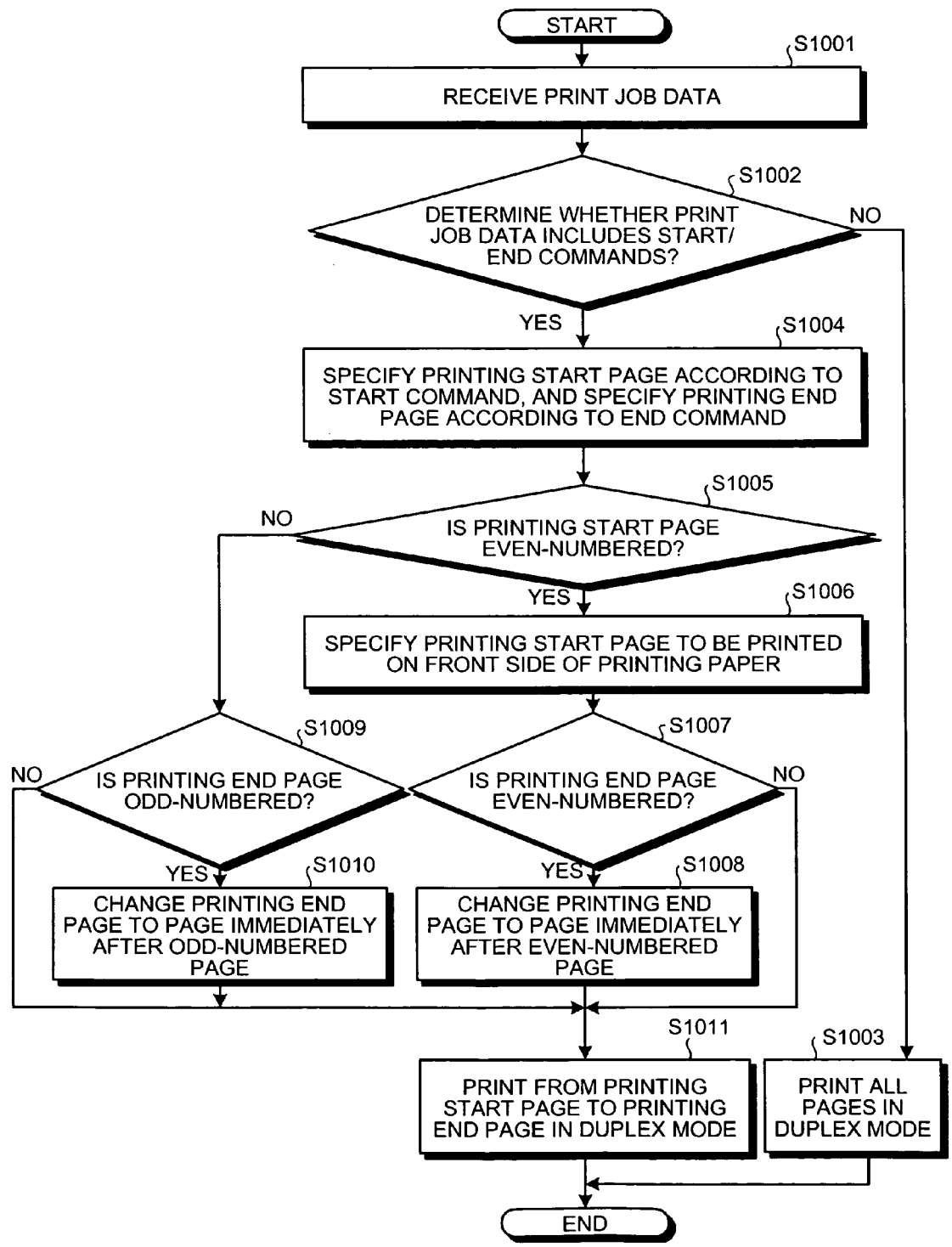
FIG. 10 is a flowchart of the operation of a printer for specifying pages to be printed according to a fourth embodiment.

FIG. 10 is a flowchart of the operation of the printer for specifying pages to be printed according to the fourth embodiment.

In FIG. 10, steps S1001 to S1004, i.e., from receipt of print job data by the receiving section 201 until the setting section 204 specifies a printing start page and a printing end page, are the same as steps S401 to S404 in FIG. 4, and the description thereof is not repeated.

After the setting section 204 specifies parameters for the printing start page and the printing end page according to the START and END commands at step S1004, the determining section 203 determines whether the parameter for the printing start page indicates an even-numbered page or an odd-numbered page counted from the first page of the print data (step S1005). When the determining section 203 determines that the parameter for the printing start page indicates an even-numbered page (Yes at step S1005), the setting section 204 resets the parameter so that the printing start page is printed on the front side of printing paper (step S1006).

Then, the determining section 203 determines whether the parameter for the printing end page indicates an even-numbered page or an odd-numbered page counted from the first page of the print data (step S1007). When the determining section 203 determines that the parameter for the printing end page indicates an even-numbered page (Yes at step S1007), the setting section 204 changes the parameter for the printing end page to indicate a page immediately after the even-numbered page (step S1008). When the determining section 203 determines that the parameter for the printing end page indicates an odd-numbered page (No at step S1007), the parameter for the printing end page is not changed.

When the determining section 203 determines that the parameter for the printing start page indicates an odd-numbered page (No at step S1005), the parameter for the printing start page is not changed. Then, the determining section 203 determines whether the parameter for the printing end page indicates an even-numbered page or an odd-numbered page counted from the first page of the print data (step S1009).

When the determining section 203 determines that the parameter for the printing end page indicates an odd-numbered page (Yes at step S1009), the setting section 204 changes the parameter for the printing end page to indicate a page immediately after the odd-numbered page (step S1010). When the determining section 203 determines that the parameter for the printing end page indicates an even-numbered page (No at step S1009), the parameter for the printing end page is not changed.

Then, the outputting section 205 sends the printer engine 110 image data formed based on a portion of the print data for pages from the printing start page to the printing end page, both specified by the parameters set by the setting section 204. The image data are printed in duplex mode from the front side of printing paper according to the parameter set at step S1006 (step S1011).

Next, the process shown in FIG. 10 is described in details with a specific example. FIG. 11 is a schematic for explaining the operation of the printer according to the fourth embodiment.

In FIG. 11, print job data includes print data for eight pages in which the fourth page is specified by a START command and the sixth page is specified by an END command. Two sets of the print data are printed. With the process in the third embodiment, the sixth page is printed on the front side of printing paper because the fourth page is printed on the front side of printing paper. Therefore, in this case, the printing start page of the second set is printed on the back side of the printing end page of the first set. Specifically, the fourth page of the second set is printed on the back side of the sixth page of the first set (an upper right view in FIG. 11).

In the printer according to the fourth embodiment, when the fourth page is specified by the START command and the sixth page is specified by the END command, the setting section 204 specifies the fourth and sixth pages, counted from the first page of the print data, as parameters for the printing start page and the printing end page, respectively (step S1004 in FIG. 10). As in the third embodiment, the setting section 204 resets the parameter for the printing start page so that the fourth page is printed on the front side of printing paper (step S1006 in FIG. 10).

The determining section 203 determines whether the parameter for the printing end page indicates an even-numbered or odd-numbered page counted from the first page of the print data (step S1007 in FIG. 10). In the example of FIG. 11, the sixth page is specified as the printing end page, and the printing end page is determined as an even-numbered page. The setting section 204 changes the parameter for the printing end page to indicate a page immediately after the sixth page, i.e., the seventh page (step S1008 in FIG. 10). As a result, the printer according to the fourth embodiment prints the fourth to seventh pages with the fourth page printed on the front side of printing paper so that the printing start page of the second set is printed on the front side of printing paper (a lower right view in FIG. 11).

As described above, according to the fourth embodiment, the determining section 203 determines whether the printing start page is even-numbered or odd-numbered, and whether the printing end page is even-numbered or odd-numbered when counted from the first page of the print data. When the determining section 203 determines that the printing start page is even-numbered and that the printing end page is even-numbered, the setting section 204 changes the printing end page to a page immediately after the even-numbered page. When the determining section 203 determines that the printing start page is odd-numbered and that the printing end page is odd-numbered, the setting section 204 changes the printing end page to a page immediately after the odd-numbered page. Thus, even when the user prints two or more sets of data, the printing start page of the second set is not to be printed on the back side of the printing end page of the first set. Further, two or more sets of print data can be printed by a simple operation without any change from the original print data.

In the first to fourth embodiments, the image-forming unit, i.e., the receiving section 201, the analyzing section 202, the determining section 203, the setting section 204, and the outputting section 205, is implemented by the image-forming program previously stored in the ROM 104. The image-forming program can also be stored, in a form of a file installable and executable on the computer, in a recording medium readable by the computer, such as a Compact Disk Read Only Memory (CD-ROM), a Flexible Disk (FD), a Compact Disk Recordable (CD-R), and a Digital Versatile Disk (DVD).

In addition, the image-forming program can be stored in another computer connected to the computer via a network such as the Internet, and downloaded to the computer via the network. The image-forming program can be delivered or distributed via a network such as the Internet.

The image-forming program is loaded from the ROM 104 into a main storage unit such as the RAM 105 when required, and executed by the CPU 101 to implement the receiving section 201, the analyzing section 202, the determining section 203, the setting section 204, and the outputting section 205 on the main storage unit.

As set forth hereinabove, according to an embodiment of the present invention, an image-forming apparatus analyzes print job data received from an information processor, and reliably outputs data in a specific range even when a manufacturer of the driver of the image-forming apparatus is different from that of the image-forming apparatus. This eliminates the need to specify a print range on the image-forming apparatus side while reducing the workload on the information processor. In addition, the data can be output by a simple operation without any change from the original print job data. Therefore, the user can easily compare a page of the partially printed data with a corresponding page of the original data (entirely printed).

Moreover, when the user prints two or more sets of data in duplex mode, a page specified as a printing end page is checked whether it is even-numbered or odd-numbered when counted from the first page of the data. If the page is odd-numbered, the printing end page is changed to a page immediately after the odd-numbered page. Accordingly, the printing start page of the second set is not to be printed on the back side of the printing end page of the first set. Thus, the two or more sets of data can be printed by a simple operation without any change from the original data.

Furthermore, a printing start page can be printed on the front side of printing paper even when the printing start page is even-numbered. Therefore, when the printing start page is the first page of a chapter, the first page of the chapter can be printed as a head page even if even-numbered.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image-forming apparatus comprising:
 a receiving unit that receives, from an information processor connected to the image-forming apparatus via a network, output job data including output data and output information of the output data;
 an analyzing unit that analyzes the output job data to determine whether the output information includes a START command specifying a start page of the output data where output is to be started and an END command specifying an end page of the output data where output is to be stopped;
 a determining unit that determines, when the image forming apparatus outputs two or more sets of output job data in duplex printing mode, whether the start page specified by the START command is even-numbered or odd-numbered when counted from a first page of a double-sided printed material and whether the end page specified by the END command is even-numbered or odd-numbered when counted from the first page;
 a setting unit that sets an output start page and an output end page based on a result of the determination by the determining unit; and
 an outputting unit that outputs a portion of the output data from the output start page to the output end page, wherein
 the setting unit sets the output end page to an odd-numbered page immediately after the end page specified by the END command when the determining unit determines that both the start page specified by the START command and the end page specified by the END command are even-numbered pages, and
 the setting unit sets the output end page to an even-numbered page immediately after the end page specified by the END command when the determining unit determines that both the start page specified by the START command and the end page specified by the END command are odd-numbered pages.

2. The image-forming apparatus according to claim 1, wherein the setting unit sets the output start page to an odd-numbered page immediately before the start page specified by the START command when the determining unit determines that the start page specified by the START command is even-numbered and the end page specified by the END command is odd-numbered.

3. The image-forming apparatus according to claim 1, wherein the setting unit sets the output start page to be printed on a front side of the first page of the double-sided printed material when the determining unit determines that the start page specified by the START command is even-numbered and the end page specified by the END command is odd-numbered.

4. An image-forming method comprising:
receiving output job data that includes output data and output information of the output data;
analyzing the output job data to determine whether the output information includes a command specifying a range of the output data, including a START command specifying a start page of the output data where output is to be started and an END command specifying an end page of the output data where output is to be stopped;
determining, when the image forming method outputs two or more sets of output job data in duplex printing mode, whether the start page specified by the START command is even-numbered or odd-numbered when counted from a first page of a double-sided printed material and whether the end page specified by the END command is even-numbered or odd-numbered when counted from the first page;
setting, when the output information includes the command, the range specified by the command as a print range, including an output start page and an output end page based on a result of the determining; and
outputting data in the print range from the output start page to the output end page, wherein
the setting sets the output end page to an odd-numbered page immediately after the end page specified by the END command when the determining determines that both the start page specified by the START command and the end page specified by the END command are even-numbered pages, and
the setting sets the output end page to an even-numbered page immediately after the end page specified by the END command when the determining determines that both the start page specified by the START command and the end page specified by the END command are odd-numbered pages.

5. The image-forming method according to claim 4, wherein the setting sets the output start page to an odd-numbered page immediately before the start page specified by the START command when the determining determines that the start page specified by the START command is even-numbered and the end page specified by the END command is odd-numbered.

6. The image-forming method according to claim 4, wherein the setting sets the output start page to be printed on a front side of the first page of the double-sided printed material when the determining determines that the start page specified by the START command is even-numbered and the end page specified by the END command is odd-numbered.

7. A computer-readable recording medium that stores therein a computer program that causes a computer to execute:
receiving output job data that includes output data and output information of the output data;
analyzing the output job data to determine whether the output information includes a command specifying a range of the output data, including a START command specifying a start page of the output data where output is to be started and an END command specifying an end page of the output data where output is to be stopped;
determining, when two or more sets of output job data in duplex printing mode are outputted, whether the start page specified by the START command is even-numbered or odd-numbered when counted from a first page of a double-sided printed material and whether the end page specified by the END command is even-numbered or odd-numbered when counted from the first page;
setting, when the output information includes the command, the range specified by the command as a print range, including an output start page and an output end page based on a result of the determining; and
outputting data in the print range from the output start page to the output end page, wherein
the setting sets the output end page to an odd-numbered page immediately after the end page specified by the END command when the determining determines that both the start page specified by the START command and the end page specified by the END command are even-numbered pages, and
the setting sets the output end page to an even-numbered page immediately after the end page specified by the END command when the determining determines that both the start page specified by the START command and the end page specified by the END command are odd-numbered pages.

8. The computer-readable recording medium of claim 7, wherein the setting sets the output start page to an odd-numbered page immediately before the start page specified by the START command when the determining determines that the start page specified by the START command is even-numbered and the end page specified by the END command is odd-numbered.

9. The computer-readable recording medium of claim 7, wherein the setting sets the output start page to be printed on a front side of the first page of the double-sided printed material when the determining determines that the start page specified by the START command is even-numbered and the end page specified by the END command is odd-numbered.

* * * * *